US008890764B2

(12) United States Patent
Orihashi (10) Patent No.: US 8,890,764 B2
(45) Date of Patent: Nov. 18, 2014

(54) ARRAY ANTENNA APPARATUS HAVING SHORTEST WIRING DISTANCE TO ANTENNA ELEMENTS

(75) Inventor: Naoyuki Orihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 219 days.

(21) Appl. No.: 13/517,237

(22) PCT Filed: Dec. 15, 2010

(86) PCT No.: PCT/JP2010/072543
§ 371 (c)(1),
(2), (4) Date: Jun. 19, 2012

(87) PCT Pub. No.: WO2011/078029
PCT Pub. Date: Jun. 30, 2011

(65) Prior Publication Data
US 2012/0256805 A1    Oct. 11, 2012

(30) Foreign Application Priority Data
Dec. 21, 2009    (JP) ................. P2009-289139

(51) Int. Cl.
*H01Q 21/00*    (2006.01)
*H04B 7/06*    (2006.01)
*H01Q 21/06*    (2006.01)
*H01Q 3/30*    (2006.01)

(52) U.S. Cl.
CPC ........... *H01Q 21/061* (2013.01); *H04B 7/0671* (2013.01); *H01Q 3/30* (2013.01)
USPC ............................. 343/853; 343/778; 342/373

(58) Field of Classification Search
CPC ....... H01Q 21/061; H01Q 3/30; H04B 7/0671
USPC .................. 343/700 MS, 778, 853, 372, 373
See application file for complete search history.

(56) References Cited

U.S. PATENT DOCUMENTS

| 3,710,329 | A * | 1/1973 | Mailloux et al. | 342/373 |
| 5,886,671 | A * | 3/1999 | Riemer et al. | 343/776 |
| 6,252,560 | B1 * | 6/2001 | Tanaka et al. | 343/853 |
| 6,768,471 | B2 * | 7/2004 | Bostwick et al. | 343/853 |
| 7,321,339 | B2 * | 1/2008 | Mohamadi | 343/853 |
| 7,492,325 | B1 * | 2/2009 | Moosbrugger et al. | 343/853 |

FOREIGN PATENT DOCUMENTS

| JP | 02-107005 A | 4/1990 |
| JP | 09-148835 A | 6/1997 |
| JP | 11-074717 A | 3/1999 |
| JP | 11-317619 A | 11/1999 |
| JP | 2000-091831 A | 3/2000 |
| JP | 2002-076743 A | 3/2002 |
| JP | 2003-142923 A | 5/2003 |
| JP | 2003-198215 A | 7/2003 |

OTHER PUBLICATIONS

International Search Report in PCT/JP2010/072543 dated Mar. 15, 2011 (English Translation Thereof).

* cited by examiner

*Primary Examiner* — Tho G Phan
(74) *Attorney, Agent, or Firm* — McGinn IP Law Group, PLLC (57) ABSTRACT

An array antenna apparatus includes a radio circuit; an array antenna that includes a plurality of antenna elements; feeder lines that connect the radio circuit to the respective antenna elements; and a delay circuit provided at each of one or more of the feeder lines. An amount of delay of the delay circuit is set so that the sum of a phase delay by the delay circuit and a phase delay due to a difference between a length of the corresponding feeder line and a predetermined reference length is an integer multiple of 360 degrees.

8 Claims, 11 Drawing Sheets

ARRAY ANTENNA APPARATUS HAVING SHORTEST WIRING DISTANCE TO ANTENNA ELEMENTS

TECHNICAL FIELD

The present invention relates to an array antenna apparatus which has an array antenna, a feeder line, and a radio circuit.

Priority is claimed on Japanese Patent Application No. 2009-289139, filed Dec. 21, 2009, the contents of which are incorporated herein by reference.

BACKGROUND ART

In recent years, demand for Gbps-level high speed data communication has been improved for indoor radio apparatuses. In such Gbps-level high speed data communication, usage of high-frequency bands such as 60 GHz bands (i.e., milliwave bands) has been advanced.

Since transmission (reception) amplifiers for high-frequency bands are required to have a small (electric) power amplifying gain and a low power consumption, it is difficult to obtain high output power (i.e., low noise performance). Therefore, insufficient output power is covered using directional gain of an antenna.

For indoor use of a radio apparatus, downsizing of the relevant communication module is required, so that a planar antenna (e.g., patch antenna) is used instead of a three-dimensional antenna (e.g., horn antenna). Generally, planar antennas have a minute open area, and thus it is difficult to obtain a high directional gain by a single element. Therefore, the directional gain is increased using arrayed antennas.

In the arrayed antenna structure, equal-length wiring is generally used for the input from a transmission (reception) amplifier into arrayed antennas. This is because if phase and power with respect to the input into the antenna elements are irregular, the beam emitted from the array antenna is not perpendicular to the relevant antenna plane, which also causes an increase in the level of side lobes.

However, in the high-frequency bands such as milliwave bands, the equal-length wiring may degrade the performance of radio apparatuses as described below. That is, when employing the equal-length wiring, the length of each line should be the same as that of the antenna which is positioned farthest from a signal source. In this case, in order to feed an antenna element close to the signal source, line arrangement for excess length is performed, which requires an extra useless space. In addition, the larger the number of the antenna elements, the harder the arrangement thereof becomes.

Patent Document 1 discloses a technique for omitting the line arrangement for excess length while employing the equal-length wiring. In the disclosed technique, the line arrangement for excess length can be omitted by increasing an effective line length by applying a substrate, that has a high dielectric constant, to wiring parts having a short line length. Patent Documents 2 to 4 are also known as prior art documents relating to array antennas.

PRIOR ART DOCUMENT

Patent Document

Patent Document 1: Japanese Unexamined Patent Application, First Publication No. 2003-198215.
Patent Document 2: Japanese Unexamined Patent Application, First Publication No. H02-107005.
Patent Document 3: Japanese Unexamined Patent Application, First Publication No. H09-148835.
Patent Document 4: Japanese Unexamined Patent Application, First Publication No. 2002-76743.

DISCLOSURE OF INVENTION

Problem to be Solved by the Invention

For high-frequency waves such as millimeter waves, transmission loss due to feeder lines is large. As described above, in high-frequency bands, it is difficult to obtain high output power (i.e., low noise performance) from a transmission (reception) amplifier. Therefore, increase in the loss due to feeder lines causes a decrease in the communication distance.

Accordingly, the equal-length wiring having a complex structure and increased loss may considerably affect the performance of the relevant radio apparatus. Additionally, the technique disclosed by Patent Document 1 may complicate the structure.

In light of the above circumstances, an object of the present invention is to provide an array antenna apparatus having a simple structure, which can reduce the loss in feeding the array antenna as much as possible and equalize the relevant input phases, without employing the equal-length wiring.

Means for Solving the Problem

In order to achieve the above object, the present invention provides an array antenna apparatus comprising:
a radio circuit;
an array antenna that includes a plurality of antenna elements;
feeder lines that connect the radio circuit to the respective antenna elements; and
a delay circuit provided at each of one or more of the feeder lines,
wherein an amount of delay of the delay circuit is set so that the sum of a phase delay by the delay circuit and a phase delay due to a difference between a length of the corresponding feeder line and a predetermined reference length is an integer multiple of 360 degrees.

The present invention also provides an array antenna apparatus comprising:
a radio circuit;
an array antenna that includes a plurality of antenna elements; and
feeder lines that connect the radio circuit to the respective antenna elements,
wherein the radio circuit includes:
a mixer circuit that performs any one of mixing a local signal and a base band signal so as to output a modulation signal to each antenna element and mixing a modulation signal and a local signal so as to output a base band signal; and
a delay circuit that delays a phase of the base band signal.

The present invention also provides an array antenna apparatus comprising:
a radio circuit;
an array antenna that includes a plurality of antenna elements; and
feeder lines that connect the radio circuit to the respective antenna elements,
wherein the radio circuit includes:
a mixer circuit that performs any one of mixing a local signal and a base band signal so as to output a modulation signal to each antenna element and mixing a modulation signal and a local signal so as to output a base band signal; and a delay circuit that delays a phase of the local signal.

The present invention also provides an array antenna apparatus comprising:

a radio circuit;

an array antenna that includes a plurality of antenna elements;

feeder lines that connect the radio circuit to the respective antenna elements; and a serial connection circuit that consists of a phase shifter and a delay circuit and is provided at each of one or more of the feeder lines, wherein an amount of delay of the serial connection circuit is set so that the sum of a phase delay by the serial connection circuit and a phase delay due to a difference between a length of the corresponding feeder line and a predetermined reference length is an integer multiple of 360 degrees.

The present invention also provides an array antenna apparatus comprising:

a radio circuit;

an array antenna that includes a plurality of antenna elements; and feeder lines that connect the radio circuit to the respective antenna elements, wherein the radio circuit includes:

a mixer circuit that performs any one of mixing a local signal and a base band signal so as to output a modulation signal to each antenna element and mixing a modulation signal and a local signal so as to output a base band signal; and a serial connection circuit that consists of a phase shifter and a delay circuit and delays a phase of the base band signal.

The present invention also provides an array antenna apparatus comprising:

a radio circuit;

an array antenna that includes a plurality of antenna elements; and feeder lines that connect the radio circuit to the respective antenna elements, wherein the radio circuit includes:

a mixer circuit that performs any one of mixing a local signal and a base band signal so as to output a modulation signal to each antenna element and mixing a modulation signal and a local signal so as to output a base band signal; and a serial connection circuit that consists of a phase shifter and a delay circuit and delays a phase of the local signal.

Effect of the Invention

In accordance with the present invention, it is possible that a delay circuit is provided at a feeder line which connects a radio circuit and each antenna element and the delay amount thereof is set so that the sum of a phase delay by the delay circuit and a phase delay due to a difference between the length of the feeder line and a reference length is an integer multiple of 360 degrees. Accordingly, (i) the redundancy of the feeder line can be reduced so that the area and loss of the relevant radio apparatus can be reduced, and (ii) the input phases for the antennas can be equalized.

MODE FOR CARRYING OUT THE INVENTION

Below, embodiments of the present invention will be explained with reference to the drawings.

Figure 1:
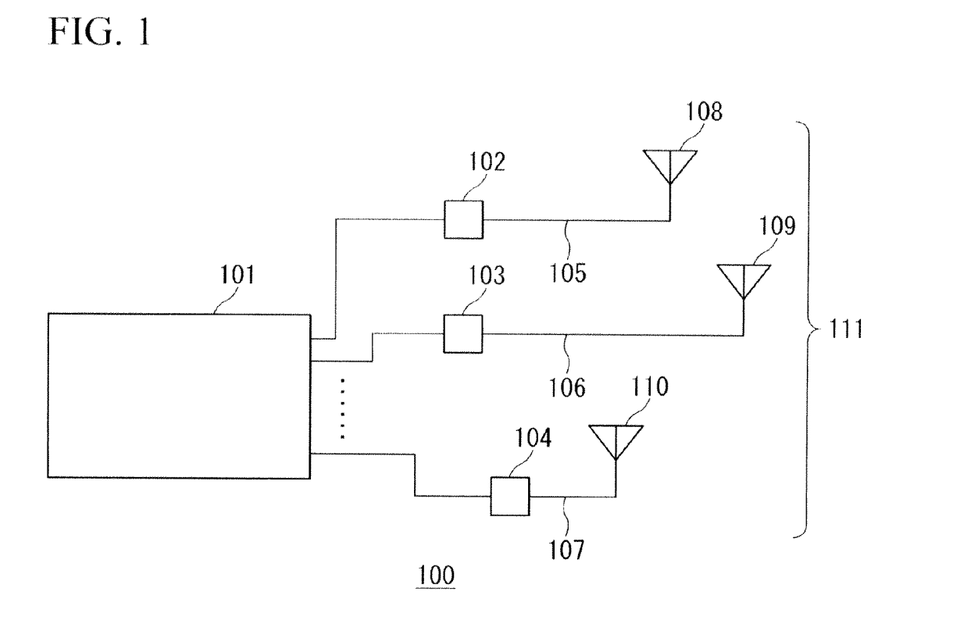
FIG. 1 is a block diagram showing the structure of an array antenna apparatus as a first embodiment of the present invention.

FIG. 1 is a block diagram showing the structure of an array antenna apparatus as a first embodiment of the present invention. In FIG. 1, an array antenna apparatus 100 consists of a radio circuit 101, an array antenna 111, feeder lines 105, 106, and 107, and delay circuits 102, 103, and 104. The array antenna 111 consists of antenna elements 108, 109, and 110.

A high-frequency signal output from the radio circuit 101 is supplied to the antenna elements 108, 109, and 110 via the corresponding feeder lines 105, 106, and 107. The delay circuits 102, 103, and 104 are inserted in the middle of the corresponding feeder lines 105, 106, and 107 so as to adjust the input phases for the antenna elements 108, 109, and 110.

The feeder lines 105, 106, and 107 each have any length.

The amount of phase delay provided by each of the delay circuits 102, 103, and 104 is defined so that the sum of the phase delay by the relevant delay circuit and a phase delay due to a difference between a reference length $L_0$ and the wiring length of the corresponding feeder line (105, 106, or 107) is an integer multiple of 360 degrees. That is, when $L_n$ indicates the line length of each feeder line, phase delay $\alpha_n$ of the corresponding delay circuit is set as:

$$\alpha_n = 360(N - (L_0 - L_n)/\lambda) \text{ degrees}$$

where N is an integer and λ is the wavelength of the signal through the relevant feeder line.

$L_0$ can be any value, for example, the length of the shortest feeder line.

The delay circuits 102, 103, and 104 may be implemented using phase shifters, capacitors, inductors, or stub lines.

According to the above structure, the input phases for the antenna elements 108, 109, and 110 can be equal while minimizing the wiring distance from the radio circuit 101 to each of the antenna elements 108, 109, and 110, implementing the downsizing, and minimizing the feeding loss. Although the relevant structure is applied to a transmitter, it may be applied to a receiver.

Figure 2:
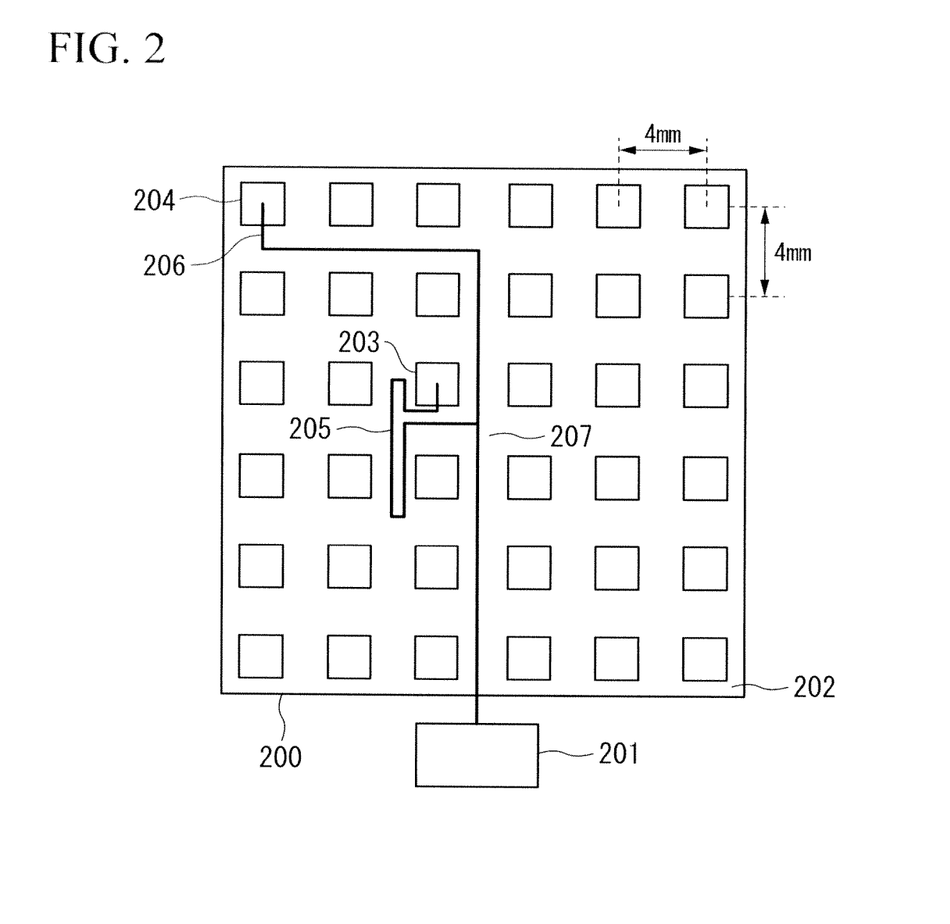
FIG. 2 is a diagram for explaining the effect of the first embodiment, where the diagram shows an example structure of conventional array antenna apparatuses.

FIG. 2 shows a conventional example of a 36-element array antenna 200 having 6×6 elements in cross and longitudinal directions in equal-length wiring. The antenna elements are arranged in regular intervals of 4 mm.

A high-frequency signal is input from a radio circuit 201 provided outside of an array antenna substrate 202, and divided at a branch point 207 set at the center of the antenna. Ideally, the size of the branch point 207 is sufficiently small in comparison with the antenna so that it can be disregarded.

The divided high-frequency signals may be input into antenna elements 203 and 204 via corresponding feeder lines 205 and 206. In the equal-length wiring, each wiring length should be the longest distance to an antenna element.

In the structure of FIG. 2, a feeder line 206 connected to the antenna element 204 is the longest, which requires at least 20 mm. Therefore, a feeder line 205 connected to the antenna element 203 which is closest to the branch point 207 requires line arrangement for considerable excess length. Accordingly, the closer the antenna element is to the branch point, the wider the required wiring space is for a redundant line arrangement, which causes complex wiring.

When employing an LTCC (Low Temperature Co-fired Ceramics) which is widely used for milliwave antennas, the loss of a feeder line (tri-plate line) is approximately 0.1 dB/mm. The total loss of the feeder lines in the structure of FIG. 2 is approximately 2 dB.

Figure 3:
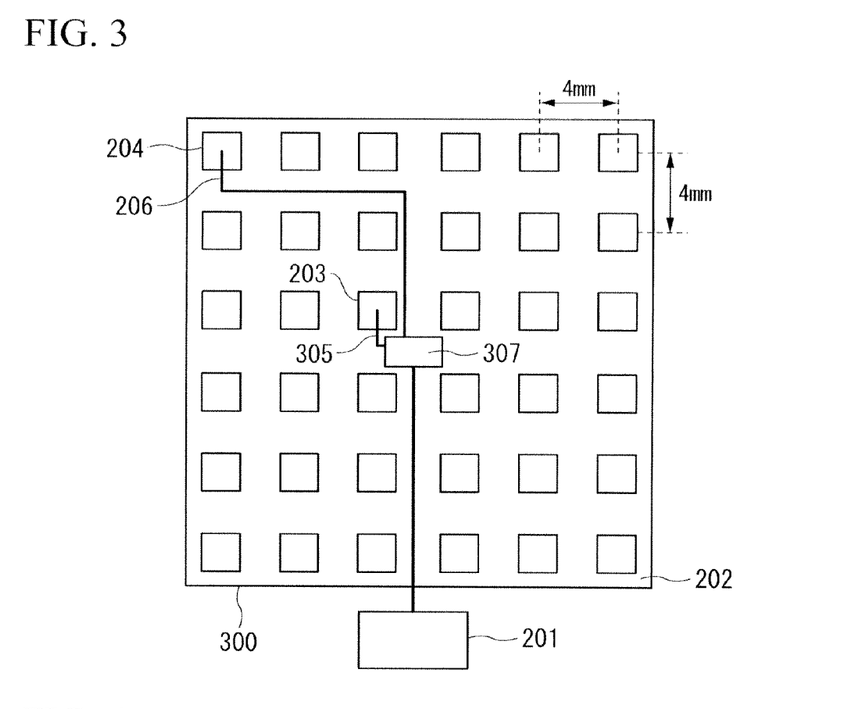
FIG. 3 is a diagram for explaining the effect of the array antenna apparatus in the first embodiment.

FIG. 3 shows a 36-element array antenna 300 having 6×6 elements in cross and longitudinal directions, to which the above-described first embodiment is applied. The arrangement and dimensions thereof coincide with those of FIG. 2.

At the center of the array antenna substrate 202, a delay circuit 307 applied to each feeder line is provided (for convenience of the drawing, a single collective block is shown). A signal is divided at the center of the array antenna substrate, and the phase delay is set in accordance with the length of each feeder line by means of the delay circuit 307. Accordingly, lines 206 and 305 respectively extending from the radio circuit 201 to the antenna elements 203 and 204 can be shortest.

When arranging the lines using the shortest distances, the total loss due to the feeder lines is estimated to be 1 dB, thereby reducing the loss by 1 dB (i.e., 2 dB for both the transmission and reception) in comparison with the equal-length wiring arrangement.

Figure 4:
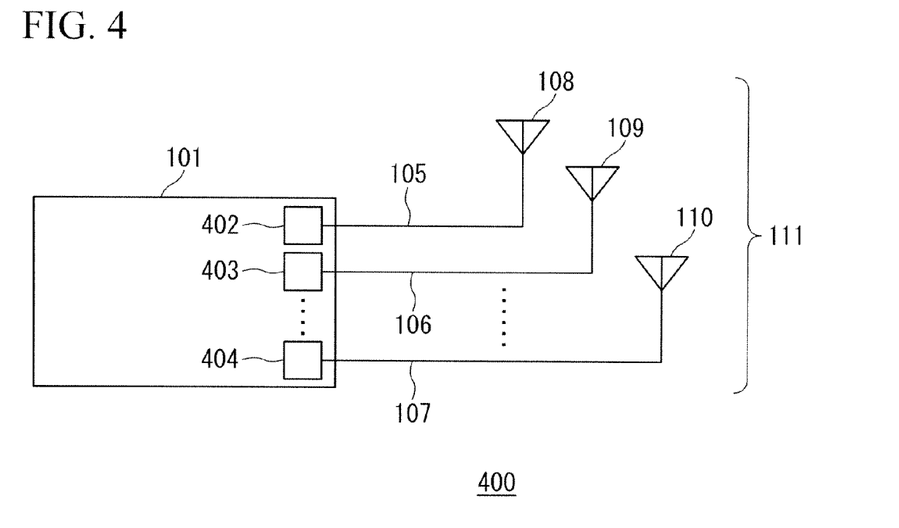
FIG. 4 is a block diagram showing the structure of an array antenna apparatus as a second embodiment of the present invention.

FIG. 4 is a block diagram showing the structure of an array antenna apparatus as a second embodiment of the present invention. In an array antenna apparatus 400 of FIG. 4, delay circuits 402, 403, and 404 are provided in the radio circuit 101 of the array antenna apparatus 100 of FIG. 1, while the delay circuits 102, 103, and 104 are omitted. In other words, the delay circuits 402, 403, and 404 are provided at the feeder lines 105, 106, and 107 within the radio circuit 101.

According to the above structure, effects similar to the first embodiment can be obtained, and complexity in the wiring caused by providing the delay circuits at the feeder lines can be reduced.

That is, since the delay circuits are provided in the radio circuit, an area to be occupied by the delay circuits can be omitted in the feeder line area. Therefore, no detour for avoiding the delay circuits is necessary, thereby reducing the complexity in the wiring.

Figure 5:
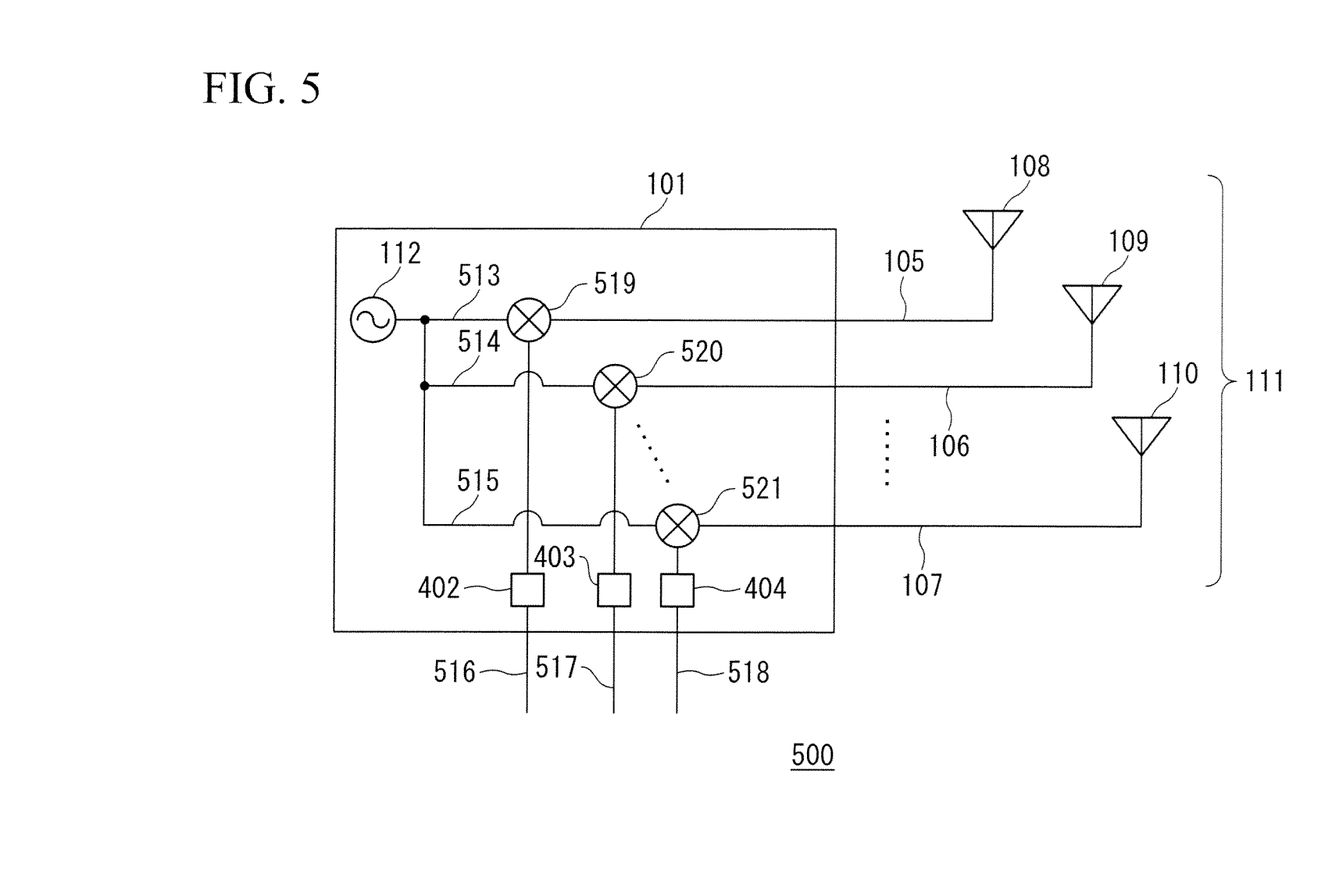
FIG. 5 is a block diagram showing the structure of an array antenna apparatus as a third embodiment of the present invention.

FIG. 5 is a block diagram showing the structure of an array antenna apparatus as a third embodiment of the present invention. In an array antenna apparatus 500 of FIG. 5, mixer circuits 519, 520, and 521 are respectively connected to the feeder lines 105, 106, and 107 which are connected to the antenna elements 108, 109, and 110 which form the array antenna 111. To the mixer circuits 519, 520, and 521, local signal lines 513, 514, and 515 and base band signal lines 516, 517, and 518 are respectively connected. In addition, delay circuits 402, 403, and 405 are respectively provided at the base band signal lines 516, 517, and 518.

The mixer circuits 519, 520, and 521 and the delay circuits 402, 403, and 405 are arranged in the radio circuit 101.

In comparison with the array antenna apparatus 400 of FIG. 4, the array antenna apparatus 500 has a structure in which the delay circuits are provided at the base band signal limes. The delay circuits 402, 403, and 405 control the phases of base band signals and also the phases of modulation signals input into the antenna elements 108, 109, and 110.

According to the above structure, complexity in the wiring caused by providing the delay circuits at the feeder lines can be reduced, and effects similar to the first embodiment can be obtained.

When applying the present structure to a receiver, each mixer circuit has a function of mixing a modulation signal with a local signal so as to output a base band signal.

Figure 6:
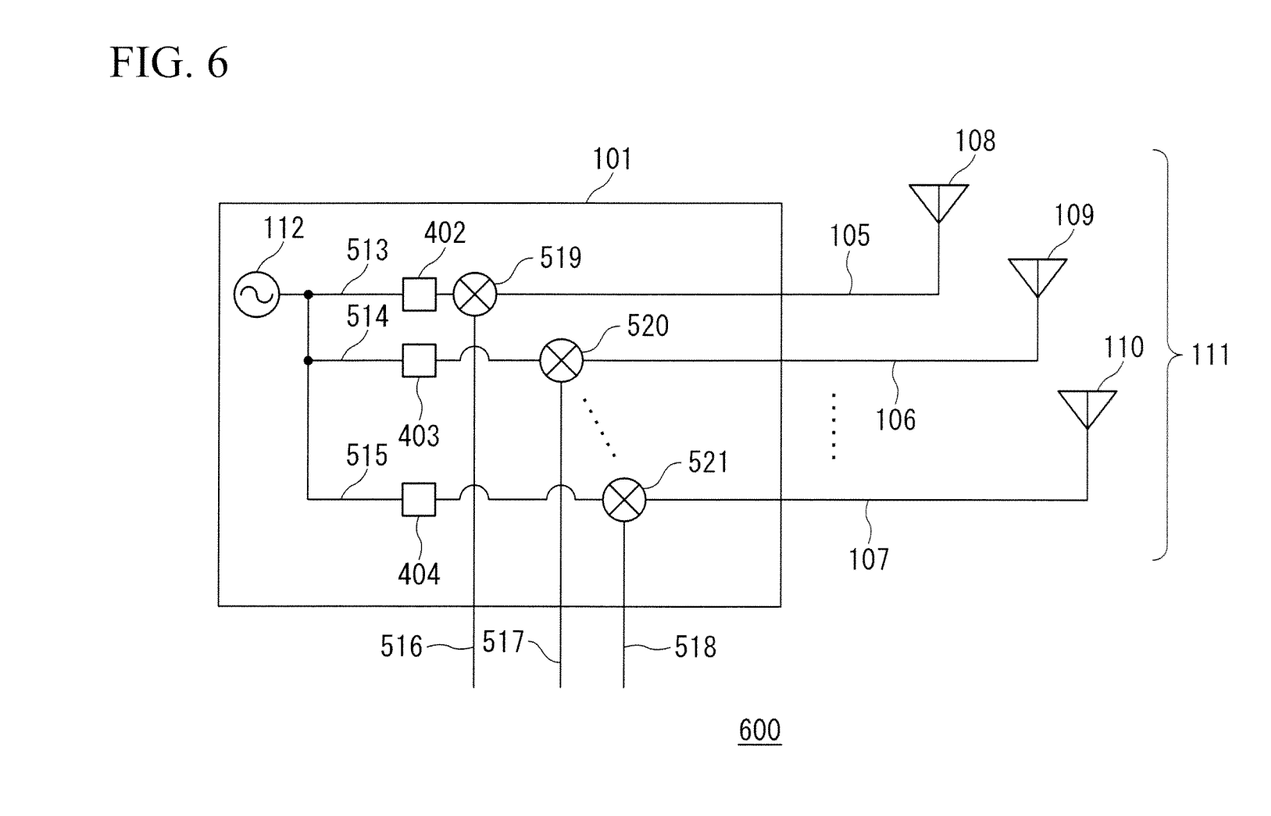
FIG. 6 is a block diagram showing the structure of an array antenna apparatus as a fourth embodiment of the present invention.

FIG. 6 is a block diagram showing the structure of an array antenna apparatus 600 as a fourth embodiment of the present invention. In the array antenna apparatus 600 of FIG. 6, in comparison with the radio circuit 101 of the array antenna apparatus 500 of FIG. 5, the delay circuits 402, 403, and 404 are provided, not at the base band signal lines 516, 517, and 518, but at the local signal lines 513, 514, and 515.

The delay circuits 402, 403, and 405 control the phases of local signals and also the phases of modulation signals input into the antenna elements 108, 109, and 110.

According to the above structure, complexity in the wiring caused by providing the delay circuits at the feeder lines can be reduced, and effects similar to the first embodiment can be obtained.

Figure 7:
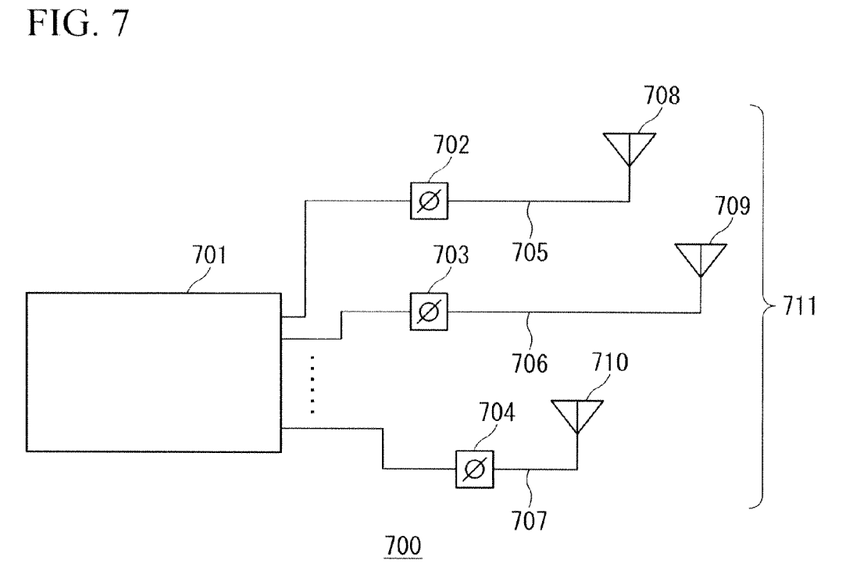
FIG. 7 is a block diagram showing the structure of an array antenna apparatus as a fifth embodiment of the present invention.

FIG. 7 is a block diagram showing the structure of an array antenna apparatus 700 as a fifth embodiment of the present invention. The array antenna apparatus 700 of FIG. 7 consists of a radio circuit 701, an array antenna 711, feeder lines 705, 706, and 707, and step phase shifters 702, 703, and 704.

The array antenna 711 consists of antenna elements 708, 709, and 710.

Three high-frequency signals output from the radio circuit 701 are respectively supplied via the feeder lines 705, 706, and 707 to the antenna elements 708, 709, and 710.

The step phase shifters 702, 703, and 704 are respectively provided at the feeder lines 705, 706, and 707 so as to control the input phases for the antenna elements 708, 709, and 710.

The step phase shifters 702, 703, and 704 each have a phase shift step of an integer submultiple of 360 degrees. The feeder lines 705, 706, and 707 each have a length defined in a manner such that difference between the length $L_n$ of the relevant line and a reference length $L_0$ corresponds to an integer multiple of the phase shift step of the corresponding phase shifter. That is, when the phase shift step of the phase shifter is θ degrees, $L_n$ is set to satisfy:

$$360(L_n-L_0)/\lambda=N\theta$$

where N is an integer and λ is the wavelength of the signal through the relevant feeder line.

$L_0$ can be any value, for example, the length of the shortest feeder line.

According to the above structure, redundancy for feeder lines, the area required for the array antenna, and the transmission loss can each be reduced without adding any parts except for circuit parts required for beam steering, and simultaneously the input phases for the antenna elements can be uniform.

The step phase shifters 702, 703, and 704 may be implemented using variable capacitors or variable inductors. Although the relevant structure is applied to a transmitter, it may be applied to a receiver.

Figure 8:
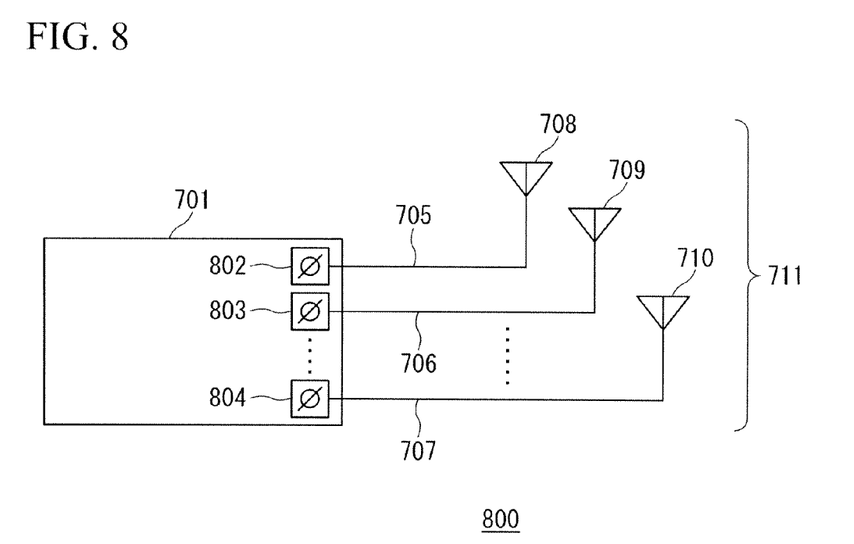
FIG. 8 is a block diagram showing the structure of an array antenna apparatus as a sixth embodiment of the present invention.

FIG. 8 is a block diagram showing the structure of an array antenna apparatus 800 as a sixth embodiment of the present invention. The array antenna apparatus 800 of FIG. 8 also has the radio circuit 701 (of the array antenna apparatus 700 of FIG. 7) in which step phase shifters 802, 803, and 804 corresponding to the above-described step phase shifters 702, 703, and 704 are integrated. The step phase shifters 802, 803, and 804 are connected to the feeder lines 705, 706, and 707.

According to the above structure, complexity in wiring due to inserting each delay circuit at the middle of the corresponding feeder line can be reduced, and effects similar to the fifth embodiment can be obtained.

Figure 9:
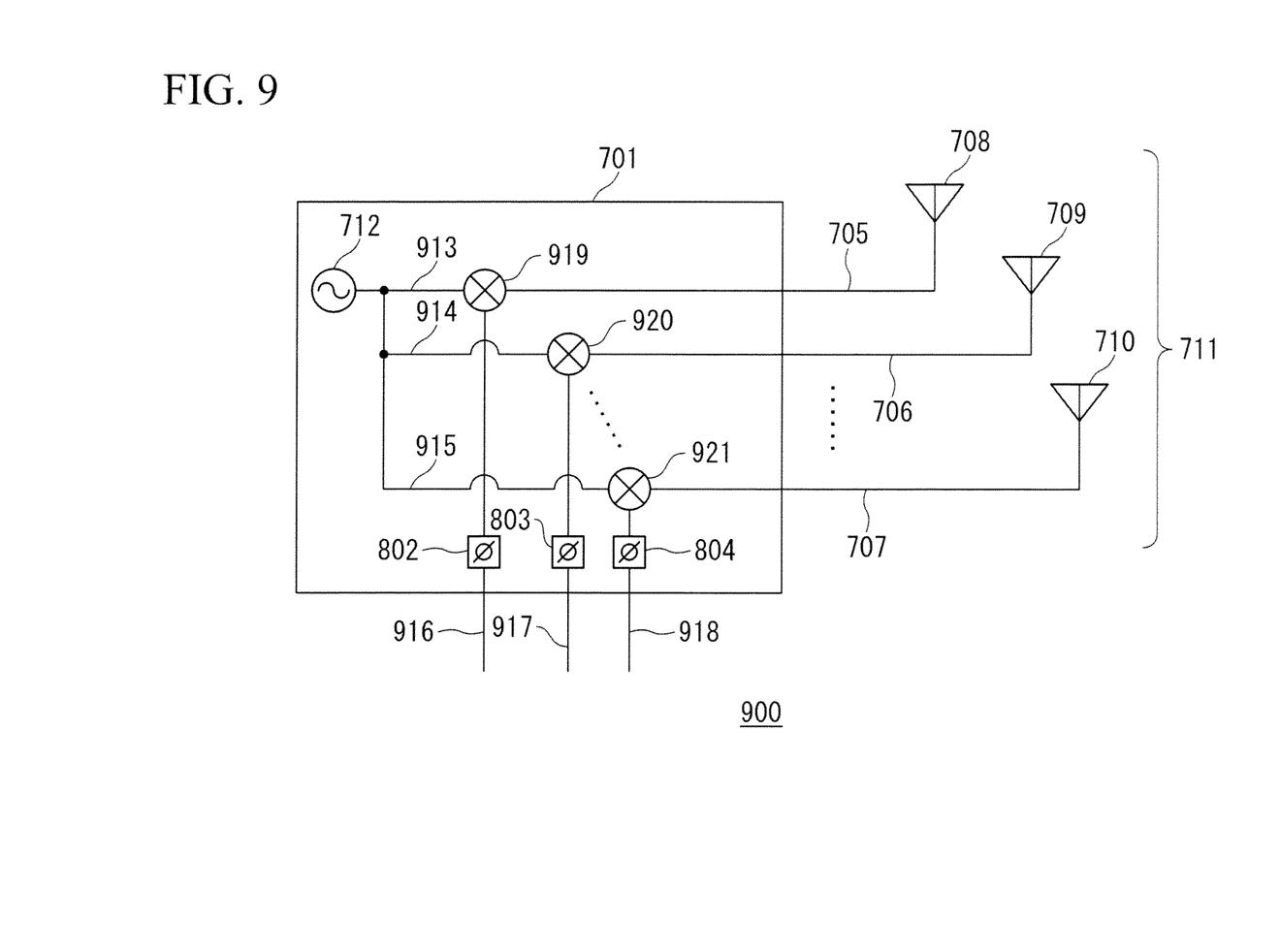
FIG. 9 is a block diagram showing the structure of an array antenna apparatus as a seventh embodiment of the present invention.

FIG. 9 is a block diagram showing the structure of an array antenna apparatus 900 as a seventh embodiment of the present invention. In the array antenna apparatus 900 of FIG. 9, mixer circuits 919, 920, and 921 are respectively connected to the feeder lines 705, 706, and 707, which are further connected to the antenna elements 708, 709, and 710 for forming the array antenna 711.

To the mixer circuits 919, 920, and 921, local signal lines 913, 914, and 915 and base band signal lines 916, 917, and 918 are respectively connected. In addition, the step phase shifters 802, 803, and 804 are respectively provided at the base band signal lines 916, 917, and 918.

The mixer circuits 919, 920, and 921 and the step phase shifters 802, 803, and 804 are arranged in the radio circuit 701.

In comparison with the array antenna apparatus 800 of FIG. 8, the array antenna apparatus 900 has a structure in which the step phase shifters 802, 803, and 804 are provided at the base band signal lines 916, 917, and 918. The step phase shifters 802, 803, and 804 control the phases of base band signals and also the phases of modulation signals input into the antenna elements 708, 709, and 710.

According to the above structure, complexity in the wiring caused by providing the delay circuits at the feeder lines can be reduced, and effects similar to the fifth embodiment can be obtained.

Figure 10:
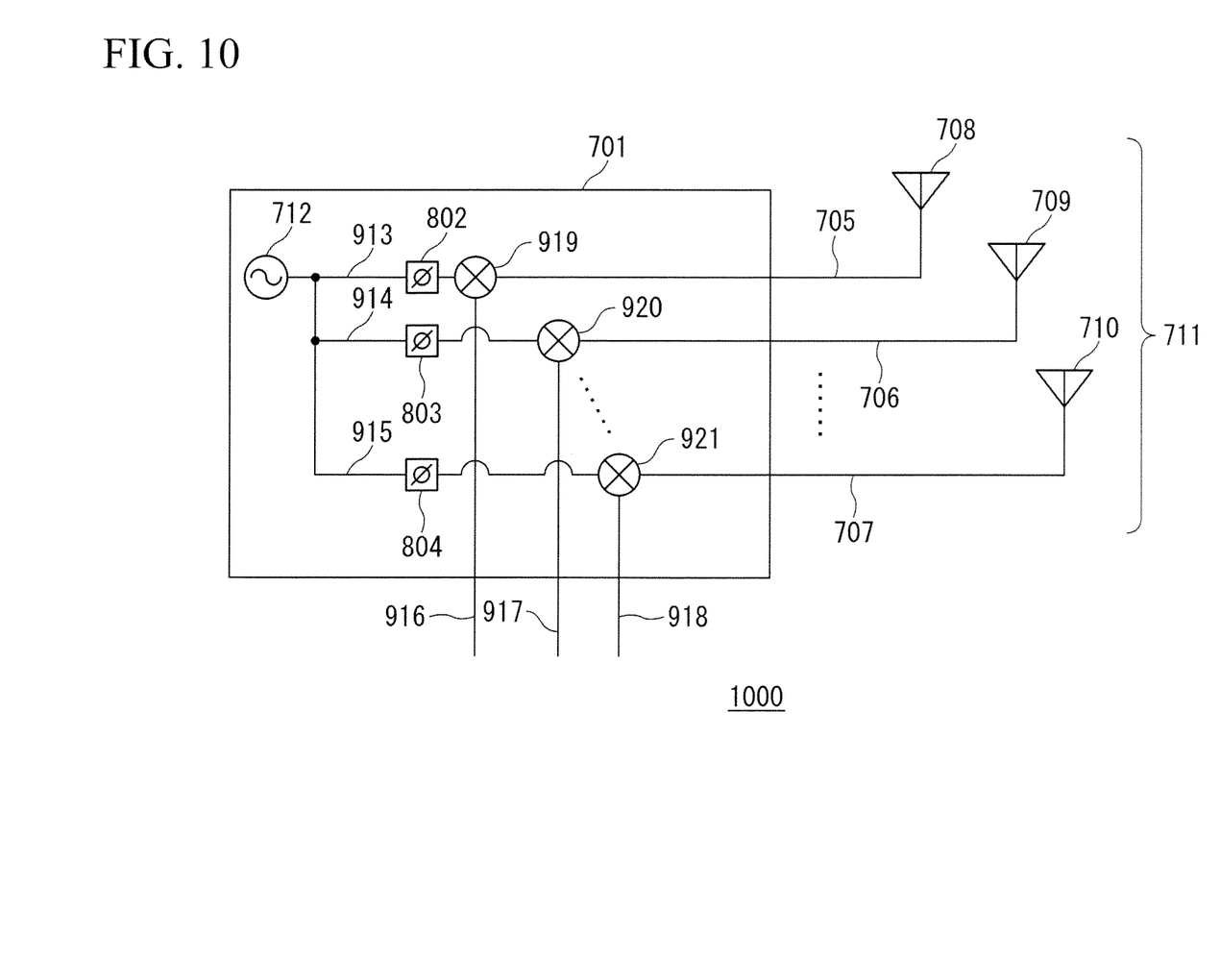
FIG. 10 is a block diagram showing the structure of an array antenna apparatus as an eighth embodiment of the present invention.

FIG. 10 is a block diagram showing the structure of an array antenna apparatus 1000 as an eighth embodiment of the present invention. The array antenna apparatus 1000 of FIG. 10 has a structure in which in the radio circuit 701 of the array antenna apparatus 900 of FIG. 9, the step phase shifters 802, 803, and 804 are provided at the local signal lines 913, 914, and 915. The step phase shifters 802, 803, and 804 control the phases of the local signals and also the phases of modulation signals input into the antenna elements 708, 709, and 710.

According to the above structure, complexity in the wiring caused by providing the delay circuits at the feeder lines can be reduced, and effects similar to the fifth embodiment can be obtained.

Figure 11:
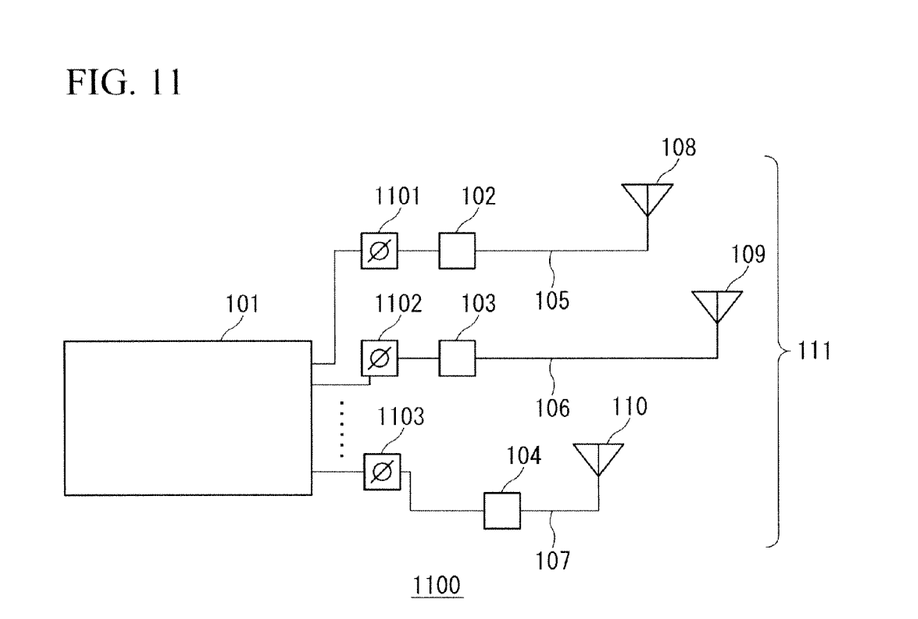
FIG. 11 is a block diagram showing the structure of an array antenna apparatus as a ninth embodiment of the present invention.

FIG. 11 is a block diagram showing the structure of an array antenna apparatus 1100 as a ninth embodiment of the present invention. The array antenna apparatus 1100 of FIG. 11 has a structure in which phase shifters 1101, 1102, and 1103 are respectively provided at the delay circuits of 102, 103, and 104 of the radio apparatus 100 in FIG. 1 so that each phase shifter and the corresponding delay circuit are connected in series.

Although the phase shifters 1101, 1102, and 1103 are respectively positioned immediately before the delay circuits 102, 103, and 104 in the present embodiment, they may be positioned immediately after the respective delay circuits.

The amount of delay by each serial connection circuit consisting of the phase shifter and the delay circuit is determined so that the sum of the phase delay by the serial connection circuit and a phase delay due to a difference between the length of the relevant feeder line and a reference length is an integer multiple of 360 degrees.

According to the above structure, effects similar to the first embodiment can be obtained, and required beam steering can be implemented.

Figure 12:
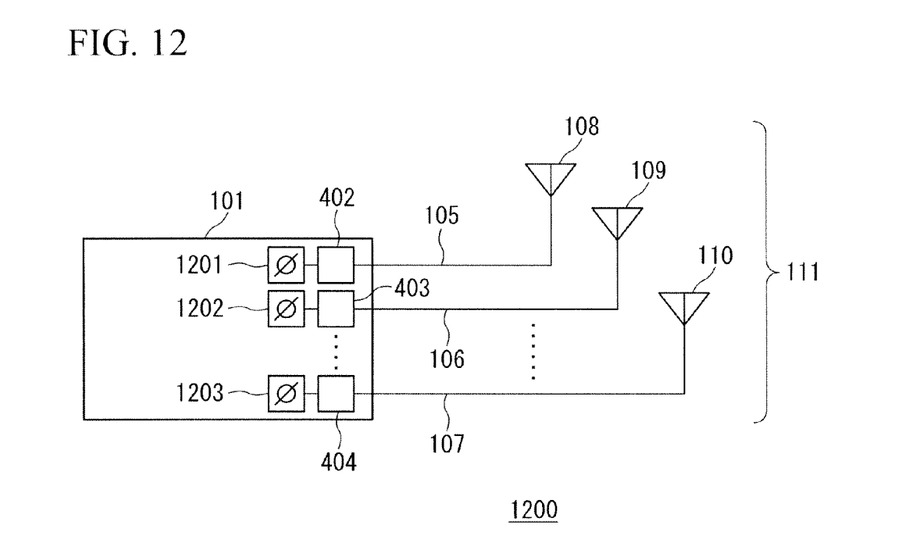
FIG. 12 is a block diagram showing the structure of an array antenna apparatus as a tenth embodiment of the present invention.

FIG. 12 is a block diagram showing the structure of an array antenna apparatus 1200 as a tenth embodiment of the present invention. The array antenna apparatus 1200 of FIG. 12 has a structure in which phase shifters 1201, 1202, and 1203 are respectively provided at the feeder lines 105, 106, and 107 of the radio apparatus 400 in FIG. 4. That is, the phase shifters 1201, 1202, and 1203 are respectively connected to the delay circuits 402, 403, and 404 so that each phase shifter and the corresponding delay circuit are connected in series and are provided in the radio circuit 101.

Although the phase shifters 1201, 1202, and 1203 are respectively positioned immediately before the delay circuits 402, 403, and 404 in the present embodiment, they may be positioned immediately after the respective delay circuits.

According to the above structure, effects similar to the second embodiment can be obtained, and required beam steering can be implemented.

Figure 13:
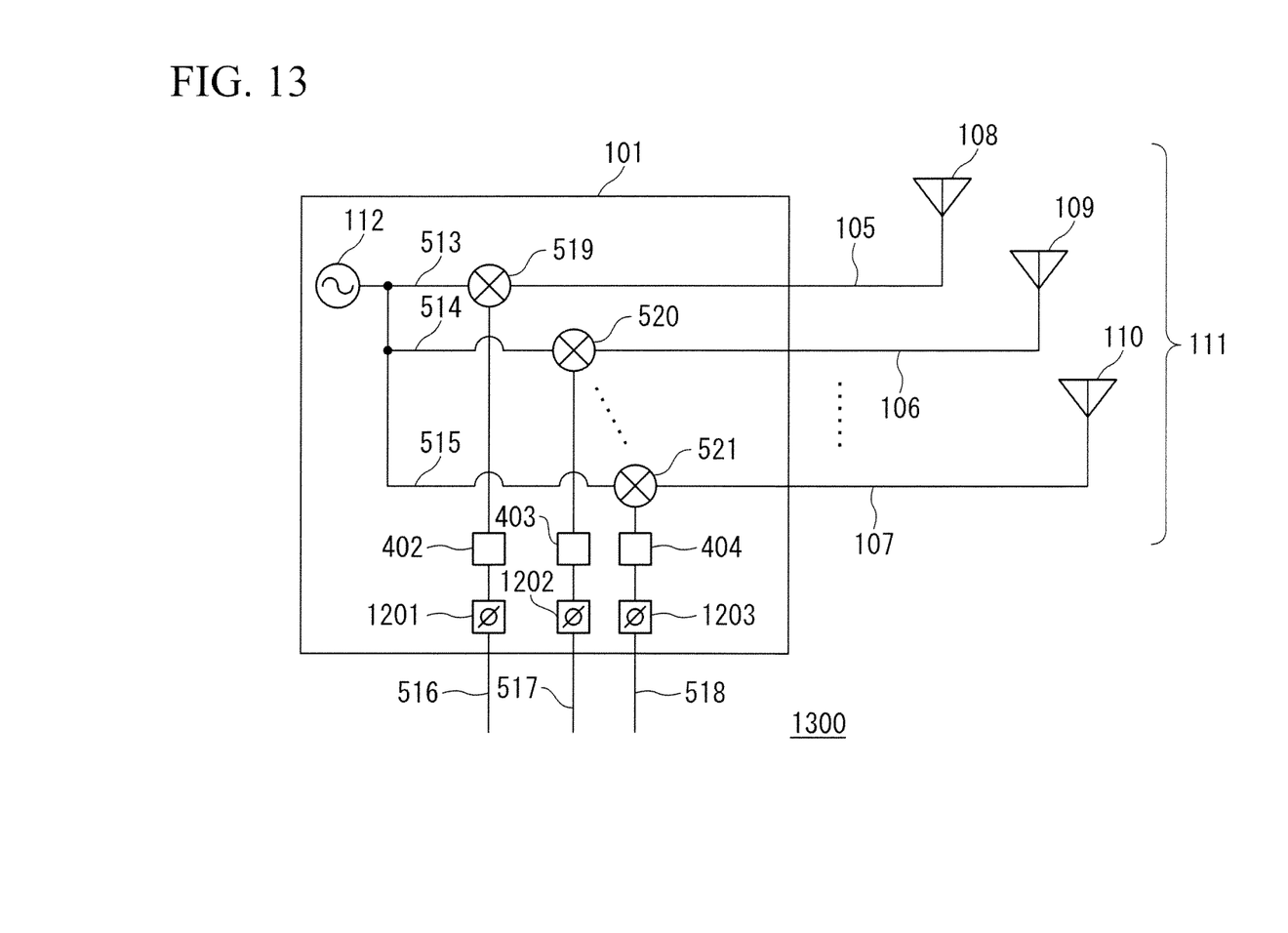
FIG. 13 is a block diagram showing the structure of an array antenna apparatus as an eleventh embodiment of the present invention.

FIG. 13 is a block diagram showing the structure of an array antenna apparatus 1300 as an eleventh embodiment of the present invention. The array antenna apparatus 1300 of FIG. 13 has a structure in which the phase shifters 1201, 1202, and 1203 are respectively provided at the base band signal lines 516, 517, and 518 of the radio apparatus 500 in FIG. 5. That is, the phase shifters 1201, 1202, and 1203 are respectively connected to the delay circuits 402, 403, and 404 so that each phase shifter and the corresponding delay circuit are connected in series and are provided in the radio circuit 101.

Although the phase shifters 1201, 1202, and 1203 are respectively positioned immediately before the delay circuits 402, 403, and 404 in the present embodiment, they may be positioned immediately after the respective delay circuits.

According to the above structure, effects similar to the third embodiment can be obtained, and required beam steering can be implemented.

Figure 14:
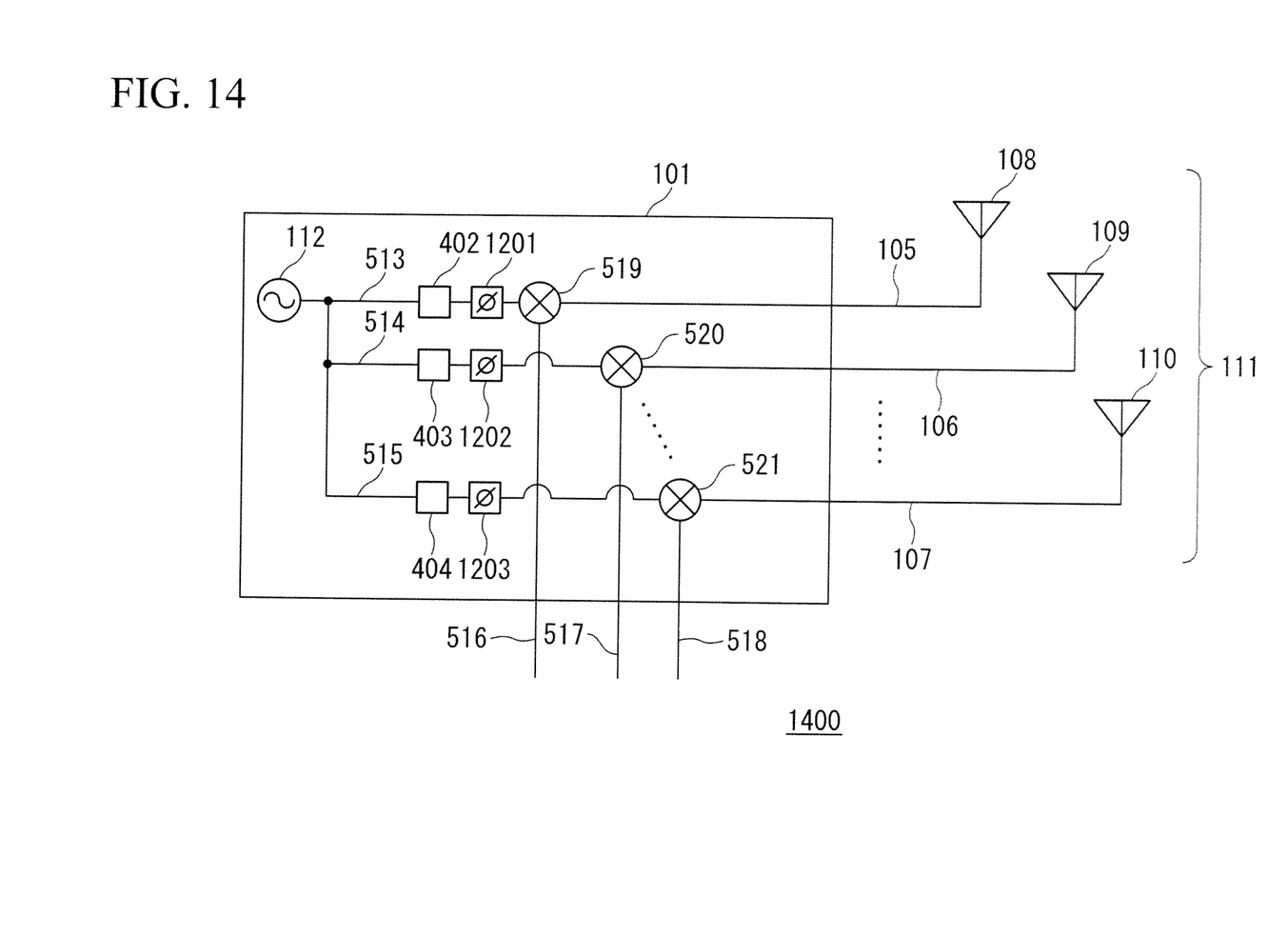
FIG. 14 is a block diagram showing the structure of an array antenna apparatus as a twelfth embodiment of the present invention.

FIG. 14 is a block diagram showing the structure of an array antenna apparatus 1400 as a twelfth embodiment of the present invention. The array antenna apparatus 1400 of FIG. 14 has a structure in which the phase shifters 1201, 1202, and 1203 are respectively provided at the local signal lines 513, 514, and 515 of the array antenna apparatus 600 in FIG. 6. That is, the phase shifters 1201, 1202, and 1203 are respectively connected to the delay circuits 402, 403, and 404 so that each phase shifter and the corresponding delay circuit are connected in series and are provided in the radio circuit 101.

Although the phase shifters 1201, 1202, and 1203 are respectively positioned immediately after the delay circuits 402, 403, and 404 in the present embodiment, they may be positioned immediately before the respective delay circuits.

According to the above structure, effects similar to the fourth embodiment can be obtained, and required beam steering can be implemented.

Although the block diagrams of FIGS. 1 and 4 to 14 each show a minimum-scale structure for explaining the relevant function, actual array antenna apparatuses include other structural elements such as an amplifier or a filter as required.

Additionally, the structure of each embodiment can also be implemented when the base band signal is an IF (Intermediate Frequency) signal.

While the embodiments of the present invention have been described in detail using the drawings, specific structures are not limited thereto, and modifications can be made without departing from the scope of the present invention.

The array antenna apparatus of the present invention has been described. In accordance with the present invention, if a delay circuit is provided at a feeder line which connects a radio circuit and each antenna element and the delay amount thereof is set so that the sum of a phase delay by the delay circuit and a phase delay due to a difference between the length of the feeder line and a reference length is an integer multiple of 360 degrees, then (i) the redundancy of the feeder line can be reduced so that the area and loss of the relevant radio apparatus can be reduced, and (ii) the input phases for the antennas can be equalized.

The reason follows: since the feeder line for connecting a radio circuit to each antenna can have any length, minimum-distance wiring is ideally possible for each feeder line, thereby reducing the redundancy for the line structure and reducing the area and loss of the relevant radio apparatus. In addition, since the sum of the phase delay by the delay circuit and the phase delay due to the difference between the length of the feeder line and the reference length is set to an integer multiple of 360 degrees, the input phases for the antennas can be equalized.

Additionally, if a radio circuit includes (i) a mixer circuit that performs any one of mixing a local signal and a base band signal so as to output a modulation signal to each antenna element and mixing a modulation signal and a local signal so as to output a base band signal, and (ii) a delay circuit that delays the phase of the above base band signal or the local signal, then the redundancy for the feeder line can be reduced and the area and loss of the relevant radio apparatus can be reduced without adding any circuit other than those required for beam steering, and simultaneously the input phases for the antennas can be equalized.

The reason follows: if there is a phase shifter having a phase shift step of an integer submultiple of 360 degrees, and a phase difference due to a difference between the length of each feeder line and a reference length is an integer multiple of the phase shift step of the phase shifter, then the input phase for each antenna can be uniform by means of a phase shift control using the phase shifter.

If a serial connection circuit between a phase shifter and a delay circuit is provided at a feeder line that connects a radio circuit to each antenna element, the redundancy for the feeder line can be reduced so that the area and loss of the relevant radio apparatus can be reduced, the input phases for the antennas can be equalized, and beam steering can be implemented.

If a radio circuit includes (i) a mixer circuit that performs any one of mixing a local signal and a base band signal so as to output a modulation signal to each antenna element and mixing a modulation signal and a local signal so as to output a base band signal, and (ii) a serial connection circuit that includes a phase shifter and a delay circuit and delays the phase of the above base band signal or the local signal, then the redundancy for the feeder line can be reduced so that the area and loss of the relevant radio apparatus can be reduced, the input phases for the antennas can be equalized, and beam steering can be implemented.

The above delay circuit may be implemented using a variable capacitor.

The above delay circuit may be implemented using a variable inductor.

The above delay circuit may be implemented using a stub line.

INDUSTRIAL APPLICABILITY

In accordance with the present invention, it is possible to implement an array antenna apparatus having a simple structure, which can reduce the loss in feeding the array antenna as much as possible and equalize the relevant input phases, without employing the equal-length wiring.

| Reference Symbols | |
|---|---|
| 100, 200, 300, 400, 500, 600, 700, 800, 900, 1000, 1100, 1200, 1300, 1400 | array antenna apparatus |
| 101, 201, 701 | radio circuit |
| 102 to 104, 307, 402 to 404 | delay circuit |
| 105 to 107, 206, 305, 705 to 707 | feeder line |
| 108 to 110, 203, 204, 708 to 710 | antenna element |
| 111, 300, 711 | array antenna |
| 519 to 521, 919 to 921 | mixer circuit |
| 513 to 515, 913 to 915 | local signal line |
| 516 to 518, 916 to 918 | base band signal line |
| 702 to 704, 802 to 804, 1101 to 1103, 1201 to 1203 | step phase shifter |

The invention claimed is:

1. An array antenna apparatus comprising:
a radio circuit;
an array antenna that includes a plurality of antenna elements;
feeder lines that connect the radio circuit to respective ones of said antenna elements; and
a delay circuit provided at one or more of the feeder lines,
wherein an amount of delay of the delay circuit is set so that a sum of a phase delay by the delay circuit and a phase delay due to a difference between a length of a corresponding feeder line and a predetermined reference length is an integer multiple of 360 degrees,
wherein the delay circuit is formed using a phase shifter, and
wherein the phase shifter has a phase shift step of an integer submultiple of 360 degrees, and a phase difference due to the difference between the length of the corresponding feeder line and the predetermined reference length is an integer multiple of the phase shift step of the phase shifter.

2. The array antenna apparatus in accordance with claim 1, wherein the delay circuit is provided within the radio circuit.

3. The array antenna apparatus according to claim 1, wherein said length of said corresponding feeder line is set such that said phase difference due to the difference between the length of the feeder line and the predetermined reference length is an integer multiple of the phase shift step of the phase shifter.

4. The array antenna apparatus according to claim 1, wherein said length of said corresponding feeder line is set in advance.

5. The array antenna apparatus according to claim 1, wherein an input phase for each of said respective ones of said antenna elements is uniform.

6. An array antenna apparatus comprising:
a radio circuit;
an array antenna that includes a plurality of antenna elements; and
feeder lines that connect the radio circuit to respective ones of said antenna elements,
wherein the radio circuit includes:
   a mixer circuit that performs any one of mixing a local signal and a base band signal so as to output a modulation signal to each antenna element and mixing a modulation signal and a local signal so as to output a base band signal; and
   a delay circuit that delays a phase of the base band signal,
wherein the delay circuit is formed using a phase shifter, and
wherein the phase shifter has a phase shift step of an integer submultiple of 360 degrees, and a phase difference due to a difference between a length of a feeder line and a predetermined reference length is an integer multiple of the phase shift step of the phase shifter.

7. The array antenna apparatus according to claim 6, wherein said base band signal comprises an IF (Intermediate Frequency) signal.

8. An array antenna apparatus comprising:
a radio circuit;
an array antenna that includes a plurality of antenna elements; and
feeder lines that connect the radio circuit to respective ones of said antenna elements,
wherein the radio circuit includes:
   a mixer circuit that performs any one of mixing a local signal and a base band signal so as to output a modulation signal to each antenna element and mixing a modulation signal and a local signal so as to output a base band signal; and
   a delay circuit that delays a phase of the local signal,
wherein the delay circuit is formed using a phase shifter, and
wherein the phase shifter has a phase shift step of an integer submultiple of 360 degrees, and a phase difference due to a difference between a length of the feeder line and a predetermined reference length is an integer multiple of the phase shift step of the phase shifter.

* * * * *